United States Patent Office 3,385,561
Patented May 28, 1968

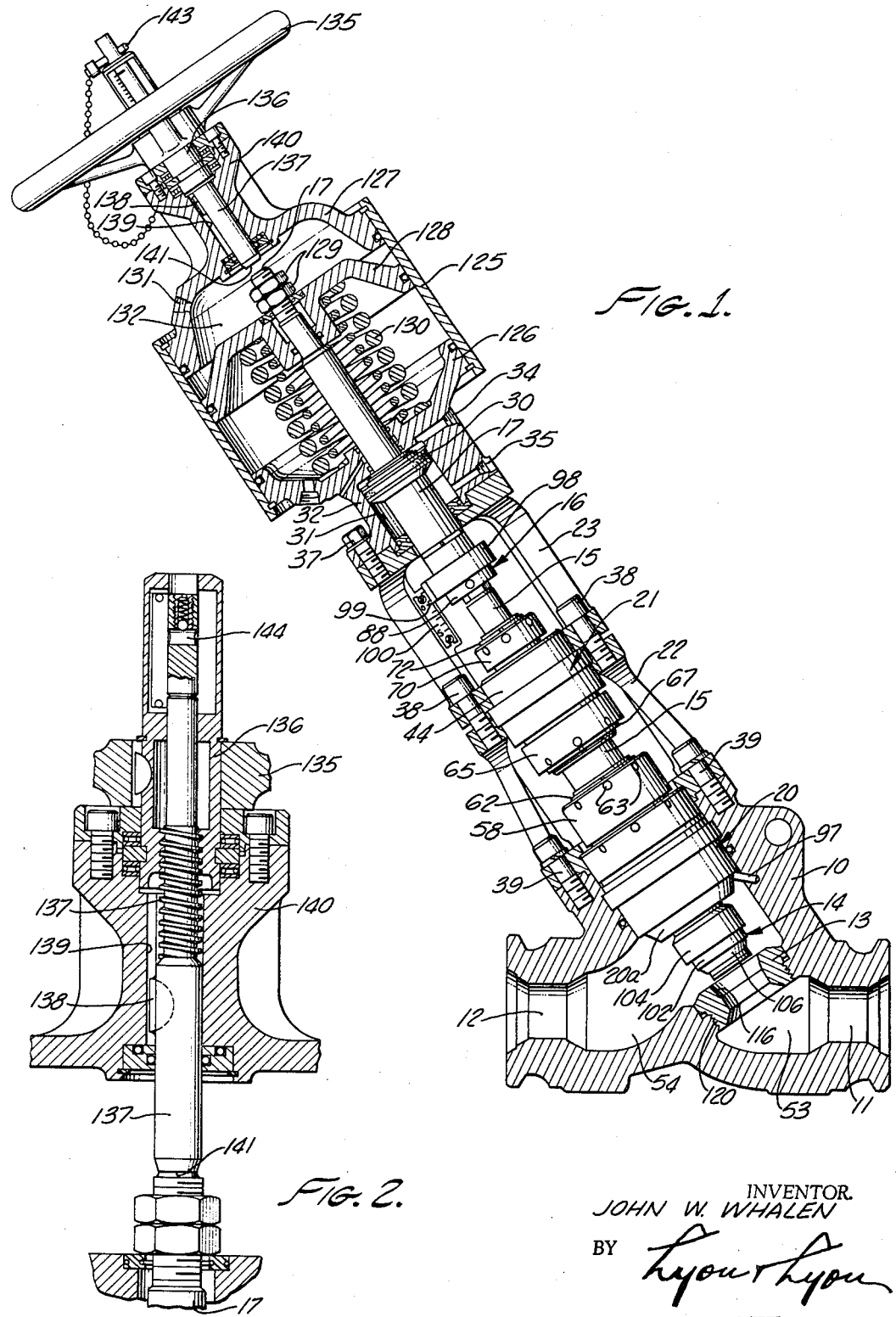

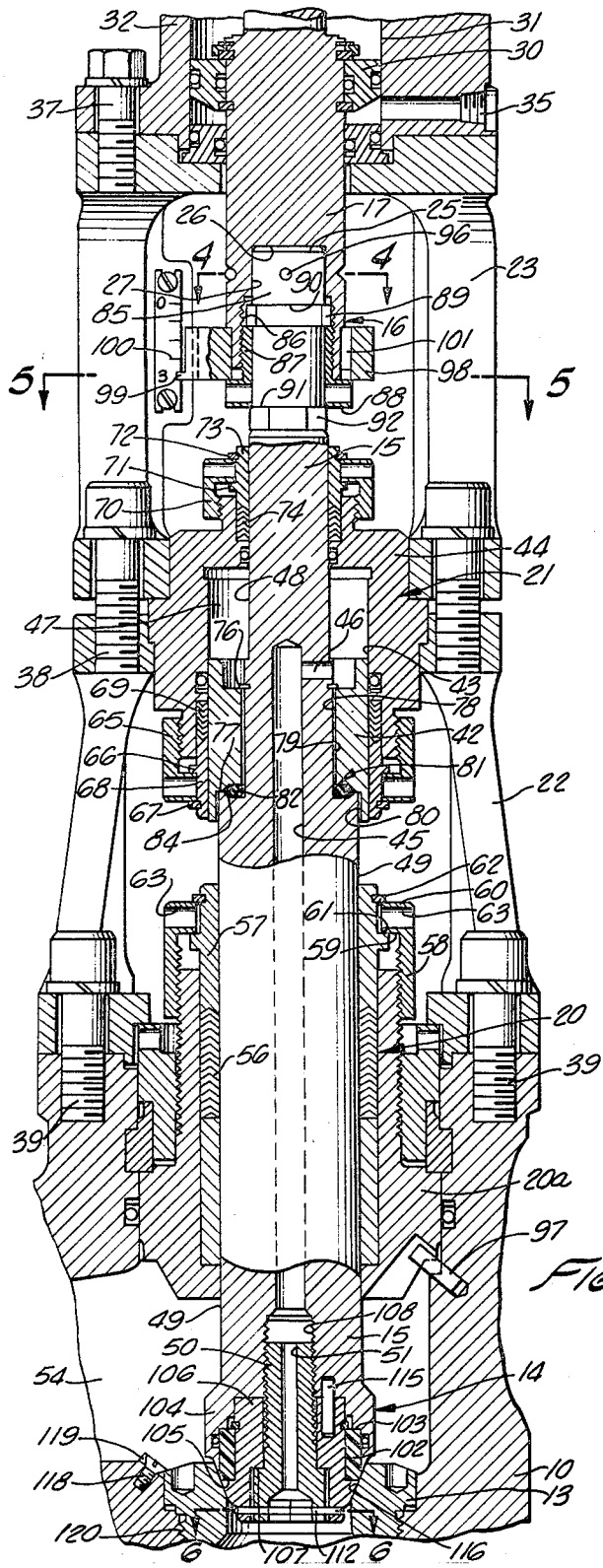

3,385,561
VALVE CONSTRUCTION
John W. Whalen, Inglewood, Calif., assignor to Calmec Manufacturing Corp., Los Angeles, Calif., a corporation of Nevada
Filed June 8, 1965, Ser. No. 462,340
5 Claims. (Cl. 251—282)

ABSTRACT OF THE DISCLOSURE

A valve having an axially movable stem carrying a valve head closing against a stationary seat is balanced against pressures on either side of the seat, tending to open or close the valve. This balance is achieved by means of a cylindrical portion on the valve stem sliding within the valve body and having a diameter equal to the effective sealing diameter of the valve head and seat, thereby balancing out pressure forces on one side of the seat. Pressure forces on the other side of the seat are balanced by means of a piston fixed to the valve stem and slidable in a bore in a stationary member fixed to the valve body, the annular area of the chamber defined between the valve stem and the bore being equal to the effective area of the valve head closed against the seat.

---

This invention relates to valves of the type having an axially moving head closing against a stationary seat and is particularly directed to improvements in valves of this type constructed for high-pressure and low-temperature service.

Among the objects of this invention are to provide a valve construction having a novel form of pressure-balancing device so that opening or closing of the valve is unaffected by the intensity of differential pressure across the valve. Another object is to provide a valve construction having a motor stem or actuator stem connected to move the valve stem axially in either direction, the connection between the two stems being of novel construction to prevent relative axial movement, but to permit relative lateral movement to compensate for misalignment of parts. Another object is to provide a valve construction of this type in which the pressure-balancing device includes a piston mounted in a novel manner on the axially movable valve stem. Another object is to provide a valve construction having a novel form of valve head employing a fully confined soft insert ring for sealing contact with the valve seat, together with novel means for preventing damage to the soft insert ring during assembly of the parts of the valve head. Another object is to provide a valve construction in which axial movement of the valve stem is accomplished by an actuator powered by fluid pressure and having an overriding manually operable actuator.

Other and more detailed objects and advantages will appear hereinafter.

In the drawings:

FIGURE 1 is a sectional side elevation showing a preferred embodiment of this invention.

FIGURE 2 is a sectional view showing a portion of FIGURE 1 on an enlarged scale.

FIGURE 3 is a sectional elevation of another portion of FIGURE 1 shown on an enlarged scale.

FIGURE 4 is a transverse sectional detail taken substantially on the lines 4—4 as shown in FIGURE 3.

FIGURE 5 is a sectional plan view taken substantially on the lines 5—5 as shown in FIGURE 3.

FIGURE 6 is a sectional detail taken substantially on the lines 6—6 as shown in FIGURE 3.

FIGURE 7 is an enlargement of a portion of FIGURE 3.

Referring to the drawings, the valve body 10, which is of the Y-globe type, is provided with openings 11 and 12, and a valve seat 13 is fixed within the body at a position therebetween. Flow may occur in either direction. A valve head assembly generally designated 14 is mounted to move axially within the body between the open position shown in FIGURE 1 and the closed position shown in FIGURE 3. The valve head assembly 14 is carried on the lower end of the valve stem 15, and the upper end of the valve stem 15 is connected by means of the connection device 16 to the lower end of the actuator stem or motor stem 17. The valve stem 15 extends through a guiding and sealing assembly 20 within the body 10, through a pressure balance device 21 clamped between the spacers 22 and 23, and has an extreme upper end 25 in surface engagement with the end wall 26 of a bore 27 in the lower end of the motor stem 17.

An annular piston 30 is fixed to the motor stem 17 and slides within an axial bore 31 of the power cylinder 32. This power cylinder 32 is fixed to the upper end of the spacer 23 and is provided with hydraulic connections 34 and 35 through which fluid under pressure may be admitted to opposite ends of the cylinder bore 31. When hydraulic fluid is admitted under pressure to port 34, the piston 30 is moved downward, thereby moving the motor stem 17 and valve stem 15 downward and causing the valve head assembly 14 to engage the stationary seat 13. Conversely, if hydraulic fluid under pressure is admitted through port 35, the piston 30 is raised, thereby lifting the motor stem 17 and valve stem 15 and moving the valve head assembly 14 away from the seat 13 to the open position shown in FIGURE 1. The power cylinder 32 is connected end-to-end to the spacer 23 by means of threaded fastenings 37, the spacers 23 and 22 are connected end-to-end by means of threaded fastenings 38, and the spacer 22 is connected to the body 10 by means of threaded fastenings 39. The stationary parts 32, 23, 22, and 10, as thus connected, function as a single stationary member.

In accordance with this invention, means are provided for balancing axial forces on the valve head assembly 14, regardless of differential pressures existing across the valve seat 13. As shown in the drawings, this means includes a pressure-compensating piston 42 fixed to the valve stem 15 and slidably mounted within a bore 43 in the stationary housing 44. This housing 44 is clamped between the spacers 22 and 23 by means of the threaded fastenings 38. The valve stem 15 is provided with an axial passage 45 communicating via lateral port 46 with the annular space 47 above the piston 42 and between the bore 43 and the cylindrical surface 48 on the valve stem 15. The cylindrical bore 43 is larger than the cylindrical portion 49 of the valve stem 15. The cross-sectional area of the annular space 47 is the same as the cross-sectional area of the effective sealing diameter of the seat 13. This effective sealing diameter is the same as the diameter of the cylindrical portion 49 of the valve stem 15. The threaded plug 50, described below, has a central axial passage 51 forming a continuation of the valve stem passage 45, and this passage is open at its lower end.

When the valve is closed and when pressure in the valve body cavity 53 upstream from the seat 13 exceeds the pressure in the downstream cavity 54, there is an axial force developed tending to lift the valve head assembly 14 away from the seat 13. The magnitude of this force is equal to the unit pressure in the upstream cavity 53 multiplied by the effective cross section area of the sealing diameter of the valve head. This upstream pressure, however, is reflected through the passages 51 and 45 and port 46 into the annular space 47, where the same pressure acts downward on the piston 42 to apply a downward axial force on the valve stem 15. The result is that the axial forces tending to open the valve are exactly balanced by axial forces tending to close the valve. It is to be noted that pressure in the downstream cavity 54 does not affect the force required to open the valve, because the diameter of the valve stem surface 49 which passes through the seal rings 56, is the same as the effective sealing diameter of the valve head assembly 14.

The sealing rings 56 are maintained under endwise pressure by means of the gland 57 and the flanged nut 58. The nut 58 has a flange provided with a downward-facing shoulder 59 and an upward-facing shoulder 60. The downward-facing shoulder 59 engages an annular abutment 61 provided on the gland 57, and the upward-facing shoulder 60 engages the lower surface of a split retainer ring 62 mounted in a groove on the flange 57. The nut 58 may be turned relative to the gland 57 by inserting a suitable tool, not shown, into the radial openings 63 in the flange. Since the gland 57 and nut 58 are held together as an assembly, uniform pressure contact of the gland on the entire circumference of the packing assembly is assured. Uneven compression or twisting of the packing or damaging of the gland or stem is avoided. When repacking, the gland 57 is withdrawn axially without cocking or tilting, thereby avoiding damage to the gland 57 or surface 49 of the stem 15.

Similar gland packing assemblies are provided for the piston 42 and surface 48 of the valve stem 15. Thus the nut 65 has a flange positioned between the abutment 66 and the split retainer ring 67 for moving the gland 68 axially toward or away from the packing 69. Also, a nut 70 has a flange which operates between the abutment 71 and the split retainer ring 72 to move the gland 73 axially toward or away from the packing 74. The packing 74 prevents leakage from the annular space 47 along the surface 48 of the valve stem 15, and the packing 69 prevents leakage from the annular space 47 along the outer surface of the piston 42.

A split retainer ring 76 holds the piston 42 against the shoulder 77 on the valve stem 15 and hence prevents relative axial movement therebetween. However, the bore 78 of the piston 42 is larger than the diameter of the cylindrical surface 79 of the valve stem 15, and the counterbore 80 of the piston 42 is larger than the diameter of the cylindrical surface 49 of the valve stem 15. This construction permits limited lateral movement of the piston 42 with respect to the valve stem 15, so that the piston may center itself within the bore 43 of the housing 44. A flat horizontal sealing unit 81 prevents leakage from the annular space 47 between the piston 42 and valve stem 15. This sealing unit 81 employs an O-ring 82 contacted by parallel flat surfaces 83 on the piston 42 and valve stem 15, as well as a nonmetallic backup ring 84 encircling the O-ring and having a V-shaped periphery. The axial thickness of the backup ring 84 is slightly less than that of the O-ring 82.

The connection generally designated 16 which joins the valve stem 15 to the actuator stem 17 prevents relative axial movement of these parts while permitting limited relative lateral movement thereof. The axial bore 85 in the end of the motor stem 17 is slightly larger than the diameter of the upper portion of the valve stem 15, which is received in the bore. A counterbore 86 in the motor stem 17 is internally threaded to receive the threaded portion 87 of the flange nut 88. A split ring 89 is mounted in a peripheral groove 90 in the valve stem 15, and this split ring is engaged by the upper end of the nut 88. Tightening of the nut with respect to the motor stem threads 86 thus serves to bring the surfaces 25 and 26 into contact.

An upward-facing shoulder 91 on the valve stem 15 underlies the flanged nut 88 and prevents it from moving downward. Wrench flats 92 are provided on the valve stem 15 below the shoulder 91, so that the valve stem 15 may be turned with respect to the motor stem 17 to bring holes 93 and 94 in the motor stem 17 into registry with the transverse hole 95 in the valve stem 15. When the holes are in alignment, the locking pin 96 is thrust through them, as shown in FIGURE 4. The pin 96 cannot be inserted until metal-to-metal axial contact is achieved between the valve stem 15 and the motor stem 17. This pin 96 prevents the valve stem 15 from turning and prevents the flanged nut 88 from loosening, thereby positively containing the split ring 89. A position-indicator ring 98 may be secured to the motor stem 17 by means of the flange nut 88, and a pointer 99 on this member 88 travels along a vertical scale 100, fixed to the spacer 23. The key 101 prevents turning movement of the parts 17 and 15 relative to ring 98. The pin 97 prevents turning movement of the parts 10 and 20a.

The valve head assembly 14 at the lower end of the valve stem 15 includes a soft seal ring 102 approximately rectangular in cross section and confined axially between a radial shoulder 103 on the valve-head enlargement 104 and a radial shoulder 105 on the carrier sleeve 106. The sleeve 106 is clamped rigidly to the valve head 104 by means of the shoulder 107 on the threaded retainer 50, which is received within the internal threads 108 on the valve stem 15. As shown in FIGURE 6, radial holes 110 are provided in the lowermost portion of the sleeve 106, and radial holes 111 are provided on the lowermost portion of the retainer 50. A pin 112 is thrust through aligned holes to maintain the retainer 50 in fully tightened position. The central portion 113 of the pin 112 is then spread and deformed as shown to prevent disassembly.

An axially extending dowel pin 115 connects the sleeve 106 with the valve stem 15 to prevent relative rotary movement while the retainer 50 is being turned to clamp the sleeve 106 rigidly in position. The dowel pin thus prevents any turning or twisting or shearing of the soft insert ring at 102 during assembly of the parts. Only the lower outer corner of the soft insert ring 102 remains unsupported by the parts of the valve head 104 and sleeve 106, and this exposed, unsupported portion of the soft ring contacts the tapered sealing surface 116 of the valve seat 13 to form the shutoff seal. The effective diameter of the valve head seal lies on this exposed, unsupported portion of the soft ring 102.

The screw 118 and its cup 119 are mounted in a position on the valve body 10 to overlie a portion of the valve seat 13 and thereby prevent disassembly of the seat 13 along the threads 120.

In addition to the hydraulic power actuator, which includes the piston 30 and cylinder 32, there is provided a pneumatic actuator for operation of the motor stem 17 by air pressure. As shown in FIGURE 1, a cylindrical housing 125 is connected to end members 126 and 127 at opposite ends thereof, and a sliding piston 128 contacts the inner cylindrical surface of the housing 125. This piston 128 is fixed to the upper end of the motor stem 17 by means of jam nuts 129. One or more coil compression springs 130 may be positioned between the end member 126 and the sliding piston 128. When air pressure is admitted through port 131 into the chamber 132 between the end member 127 and the piston 128, the piston 128 moves downward in a direction to compress the springs 130, thereby moving the motor stem 17 and valve stem 15 in a direction to close the valve assembly 14 against the seal 13. When the air pressure is vented from the chamber 132, the springs 130 return the motor stem 17 to upward position, thereby opening the valve. In practice, either hydraulic pressure or air pressure is used to open and close the valve, but in the event of failure of one of these systems, the other may be used as described above to close the valve against the seat 13.

An additional safety device is provided for closing the valve in an emergency, in the event of failure of both hydraulic pressure and air pressure. As shown in the drawings, this emergency closing means includes a manually operable wheel 135 mounted to turn the nut 136 with respect to a threaded stem 137. A key 138 on the axially movable stem 137 slides in a keyway 139 provided in the stationary member 140. The lower end 141 of the threaded stem 137 is axially aligned with and adapted to be brought into contact with the extreme upper end of the motor stem 17.

When the threaded stem 137 is in the raised, inoperative position, the cross pin 143 is inserted into a transverse opening 144 in the upper end of the threaded stem 137 to prevent accidental lowering of the manually operable threaded stem 137.

Having fully described my invention, it is to be understood that I am not to be limited to the details herein set forth, but that my invention is of the full scope of the appended claims.

I claim:

1. In a valve construction, the combination of: a valve body having a stationary seat therein, a valve stem mounted for axial movement in said body and having a valve head thereon movable into sealing contact with said seat, said valve stem having a cylindrical portion slidably mounted in said valve body, sealing means preventing leakage between said cylindrical portion and said valve body, the diameter of said cylindrical portion being the same as the effective sealing diameter of the valve head and seat, a stationary member fixed relative to the valve body and having an axial cylindrical bore of larger diameter than said cylindrical portion of said valve stem, the member having an end wall through which said valve stem extends, a piston slidable in said bore and fixed against axial movement relative to said valve stem, seal means preventing leakage between the piston and the bore and between the valve stem and said end wall, the bore, piston, valve stem and end wall cooperating to define an annular chamber, and the valve stem having passage means therein establishing communication between said annular chamber and the extreme end of said valve head.

2. In a valve construction, the combination of: a valve body having a stationary seat therein dividing the interior into an inlet cavity and an outlet cavity, a valve stem mounted for axial movement in said body and having a valve head thereon in said outlet cavity moving into sealing contact with said seat, said valve stem having a cylindrical portion slidably mounted in said valve body, sealing means preventing leakage between said cylindrical portion and said valve body, the diameter of said cylindrical portion being the same as the effective sealing diameter of the valve head and seat, a stationary member fixed relative to the valve body and having an axial cylindrical bore of larger diameter than said cylindrical portion of said valve stem, the member having an end wall through which said valve stem extends, a piston slidable in said bore and fixed against axial movement relative to said valve stem, seal means preventing leakage between the piston and the bore and between the valve stem and said end wall, the bore, piston, valve stem and end wall co-operating to define an annular chamber, and the valve stem having passage means therein establishing communication between said annular chamber and said inlet cavity.

3. In a valve construction, the combination of: a valve body having a stationary seat therein dividing the interior into an inlet cavity and an outlet cavity, a valve stem mounted for axial movement in said body and having a valve head thereon in said outlet cavity movable into sealing contact with said seat, said valve stem having a cylindrical portion slidably mounted in said valve body, sealing means preventing leakage between said cylindrical portion and said valve body, the diameter of said cylindrical portion being the same as the effective sealing diameter of the valve head and seat, a stationary member fixed relative to the valve body and having an axial cylindrical bore, the member having an end wall through which said valve stem extends, a piston slidable in said bore, means securing said piston against axial movement relative to said valve stem while permitting limited lateral movement therebetween, seal means preventing leakage between the piston and the valve stem, seal means preventing leakage between the piston and the bore and between the valve stem and said end wall, the bore, piston, valve stem and end wall co-operating to define an annular chamber, and the valve stem having passage means therein establishing communication between said annular chamber and said inlet cavity.

4. In a valve construction, the combination of: a valve body having a stationary seat therein dividing the interior into an inlet cavity and an outlet cavity, a valve stem mounted for axial movement in said body and having a valve head thereon in said outlet cavity movable into sealing contact with said seat, said valve stem having a cylindrical portion slidably mounted in said valve body, sealing means preventing leakage between said cylindrical portion and said valve body, the diameter of said cylindrical portion being the same as the effective sealing diameter of the valve head and seat, a stationary member fixed relative to the valve body and having an axial cylindrical bore, the member having an end wall through which said valve stem extends, a piston slidable in said bore and fixed against axial movement relative to said valve stem, seal means preventing leakage between the valve stem and said end wall, seal means including annular packing means interposed between said piston and said bore, a gland for axially compressing said packing, a nut threaded to the stationary member and having an annular flange, parallel radial shoulders on said gland confining the nut flange therebetween, the bore, piston, valve stem and end wall co-operating to define an annular chamber, and the valve stem having passage means therein establishing communication between said annular chamber and said inlet cavity.

5. As a subcombination, a stationary member and a movable member having a common axis, one of the members encircling the other to define an annular space between them, packing in said annular space, an annular gland for axially compressing said packing, a nut threaded to one of the members and having an annular flange, and parallel radial shoulders on said gland confining the nut flange therebetween, one of the radial shoulders being provided by a snap retainer ring mounted in a peripheral groove in the gland.

References Cited

UNITED STATES PATENTS

| | | | |
|---|---|---|---|
| 647,706 | 4/1900 | Robertshaw | 251—282 |
| 816,445 | 3/1906 | Felsberg | 277—108 X |
| 1,242,859 | 10/1917 | Plonski | 277—110 X |
| 1,807,490 | 5/1931 | Milner | 277—112 X |
| 2,456,623 | 12/1948 | Cooper | 277—108 |
| 2,497,273 | 2/1950 | Richardson. | |
| 2,527,988 | 10/1950 | Dillon. | |
| 2,897,836 | 8/1959 | Peters et al. | 251—282 X |
| 3,144,254 | 8/1964 | Krizman | 277—112 X |
| 2,783,020 | 2/1957 | Kleczek | 251—282 X |
| 2,797,061 | 6/1957 | Buchanan | 251—282 X |
| 3,038,499 | 6/1962 | Dumm | 251—282 X |
| 3,331,583 | 7/1967 | Baker | 251—282 X |

FOREIGN PATENTS 666,072   7/1963   Canada.

M. CARY NELSON, *Primary Examiner.*

ROBERT C. MILLER, *Assistant Examiner.*